3,395,654
REVERSE FLOW REACTOR AND PROCESS
Eugene Weisberg, Lakewood, and Stanley Lenox, West Orange, N.J., assignors to Ritter Pfaudler Corporation, Rochester, N.Y., a corporation of New York
Filed Dec. 2, 1966, Ser. No. 598,692
3 Claims. (Cl. 110—8)

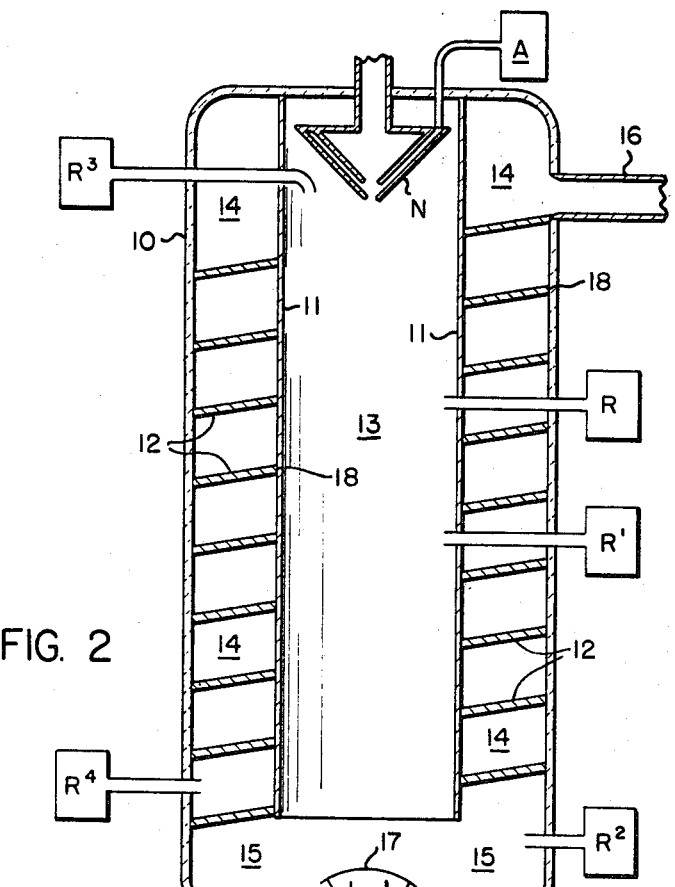
FIG. 2
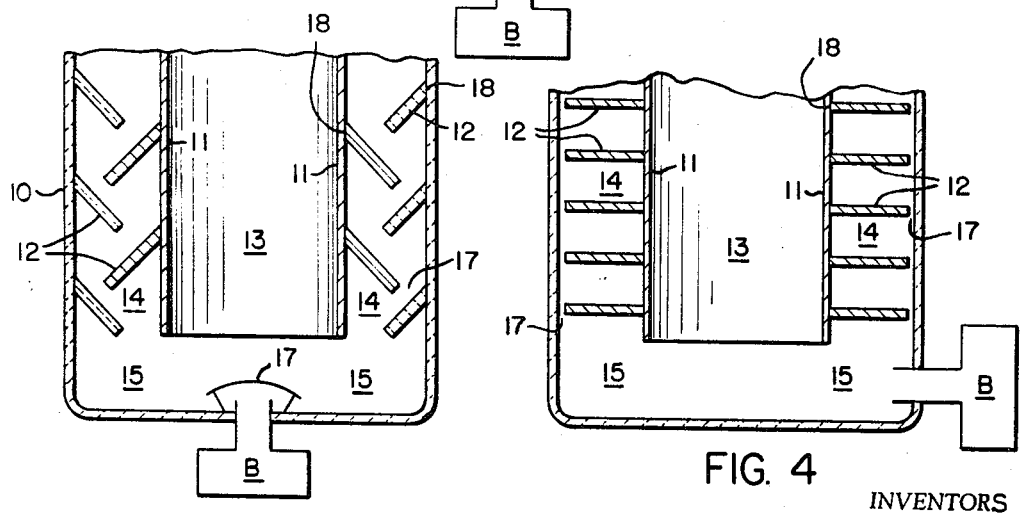
FIG. 3
FIG. 4
INVENTORS
EUGENE WEISBERG
STANLEY LENOX
ATTORNEY United States Patent Office 3,395,654
Patented Aug. 6, 1968

ABSTRACT OF THE DISCLOSURE

Finely divided materials in a gas stream are reacted by flowing the materials through a heated inner shell and then along a tortuous pathway between flow guides set in the space between the outer surface of the inner shell and the outer shell of the reactor to provide heat transfer and reuse. Sewage sludges are effectively destroyed by oxidation within this reactor and by this process.

---

This invention relates to an improved apparatus and process for the thermal treatment of finely particulate substances. In particular, the invention relates to an improved reverse flow reactor and the process for the thermal treatment of finely divided substances to provide internal heat reuse and desired physical and/or chemical changes. Most particularly, the invention relates to an improved reverse flow reactor and process suitable for the economical oxidation of finely particulate sewage sludges and conversion to substantially odorless and non-noxious solid and gaseous products through thermal treatment.

Prior art

Gauvin disclosed in U.S. Patent 2,889,874 an apparatus and process for the atomized suspension and thermal treatment of finely particulate substances, such as liquids, semi-solids or solids, that are heat treatable to form gases, such as by volatilization, decomposition, or chemical reaction. Gauvin formed finely divided liquid droplets and/or solid or semi-solid particles and supplied them to a linear chamber having a source of radiant heat. Gas, which may be evolved through the heat treatment itself, and/or may be inert or reactant carrier gas arbitrarily introduced into the chamber, carried the finely divided material through the linear chamber toward an outlet. During passage the desired heat treament took place.

The advantages obtained in the Gauvin atomized suspension heat treatment are manifold and include a substantial reduction in the time otherwise required to heat treat material and to effect desired physical and/or chemical changes. The Gauvin atomized suspension method often permits continuous flow methods to be used which previously may have been prohibited by the nature of the materials to be treated. The Gauvin method also often provides a more easily controllable method for the uniform and/or reproducible heat treatment of many materials than was previously possible; and it provides a method for more easily conducting sequential space and temperature separated heat treatments of materials within a single reactor, say vaporization and/or one or more heat activated chemical reactions.

The Permutit Company improved the Gauvin atomized suspension thermal method and apparatus to provide internal recovery and reuse of some of the heat initially employed for the thermal treatment of materials, Chemical and Engineering News, Sept. 14, 1964, p. 79. Helfgott and Webber in a subsequent article, "Atomized Suspension Technique" published in Water Works and Waste Engineering, September 1965, pp. 77–79, showed the design and described the operation of the aforesid Permutit reactor. The Permutit process comprised atomizing materials to a finely divided state, i.e. particle sizes between about 0.1 and 100 microns, and flowing them in a gas stream through a heated thermal treatment and volatilization zone defined by a heated wall of an inner shell, then diverting the direction of flow of materials around the open bottom of the shell wall past a burner and auxiliary air supply and up into an annulus formed between the inner and outer shells of the reactor. The hot treated materials thus were passed in a reverse flow direction through the annulus to that of passage through the volatilization zone, and in so doing transferred some of their heat by convection and conduction to and through the wall of the inner shell. The transferred heat once again became available to radiantly heat the finely divided materials flowing through the inner thermal treatment and volatilization zone defined by the inner shell. The Permutit reactor and method, however, provide certain problems.

The problems and invention objects

In general, adequate heat transfer to the inner shell of a reverse flow reactor, and with it heat reuse, requires adequate contact of the hot treated materials with the wall of the inner shell. Using the Permutit taught reactor, this may be done employing a very narrow annular cavity to adequately accelerate the flow of hot treated material past the wall of the inner shell to permit the desired repeated contacts of hot material with the wall. Alternately, one may use, with an arbitrary annulus width, an inner shell wall long tough for adequate contact time that may be required at an arbitrary flow rate to permit the needed repeated contacts of hot material with the wall. However, in the first instance, when the annulus is narrowed to the degree needed to effect adequate heat transfer at an arbitrary flow rate of the materials therethrough, especially for high temperature thermal processes, the accelerated flow produced in the annulus has the effect of speeding the flow of materials through heat treatment portions of the reactor, often to the degree that the residence or detention time of materials in the various thermal treatment zones is not adequate to fully effect the physical and/or chemical changes desired in materials flowing therethrough prior to discharge from the reactor. Alternately, in the second instance, when the inner shell is lengthened to the degree needed to effect adequate heat treatment and heat transfer to the inner shell at an arbitrary through-put of the materials and an arbitrary annulus width, especially for high temperature thermal processes, the overall size of the reactor must often be enlarged beyond economical limits. It is thus an object of this invention to provide a reverse flow reactor and process for the adequate heat treatment of finely particulate materials with economical internal heat reuse without restriction to either a narrow annulus or an uneconomically elongated inner shell and enlarged reactor.

Another disadvantage of the prior art reverse flow reactor and process is that when used for the destruction of sewage sludge by oxidative heat treatment, malodorous and/or otherwise noxious gaseous and solid products often result. Thus, another object of this invention is to provide a reverse flow reactor and a process to destroy sewage sludge and produce substantially odor-free and non-noxious gaseous and solid products.

Other desirable objects of this invention will become apparent from the following description when taken in conjunction with the appended drawings wherein like symbols and numbers refer to like elements.

The drawings

FIG. 2 is a vertical cross-sectional view of a reverse flow reactor of this invention containing a helical placement of flow guide elements, which elements define a helical flowpath for materials in the annulus. This embodiment is especially suitable for conducting a plurality of thermally activated time, space and/or temperature separated physical changes and/or chemical reactions.

FIG. 3 shows in partial vertical cross-section the bottom portion of a reverse flow reactor of this invention wherein annulus flow guide elements are positioned to direct the flow of hot material alternatingly toward and away from the inner and the outer shells.

FIG. 4 shows a partial vertical cross-sectional view of the bottom portion of an embodiment of the reactor of this invention wherein annulus flow guide elements are positioned to direct hot materials along a sequentially constricted and expanded flowpath which alternates toward and away from the inner shell.

*The reactor, summary and embodiments*

In general, the objects of this invention in part are realized in a reverse flow reactor comprising, in its broadest aspects, a vessel having an outer shell containing a product outlet means, a gas inlet means, an inner shell containing a material inlet means, said shell disposed within the outer shell and spaced from it and flow guide means positioned within the space between the shells which means define a tortuous pathway therein. The salient improvement of the instant reactor over prior art reverse flow reactors lay in providing a controlled tortuous pathway and with it a simple means of controlling flow rates and detention time of materials within the reactor generally, and more particularly within the space between the shells. Several unexpected advantages are provided in making the pathway for hot materials flowing between the shells tortuous: according to the invention for any width of the space between the shells and any inner shell length, by controlling the tortuous pathway by varying the number and/or spacing and/or shape and/or pitch of the flow guide elements within the shell space, one may control and obtain a desired combination of (1) flow rates of materials within the reactor and (2) detention or residence time of flowing materials within any portion of the reactor to thus (3) control the desired contact time of and (4) desired transfer of heat from hot materials to a portion of the inner shell for heat reuse to a desired degree for effecting a desired combination of space and temperature separated thermal gaseous chemical reactions and/or physical changes. Thus, the present reactor and process holds the potential to eliminate the need for external heat exchangers to recover heat for reuse and yet effect the thermal changes desired.

A fuller understanding of the apparatus of this invention may be had by reference to the drawings.

Figure 1:
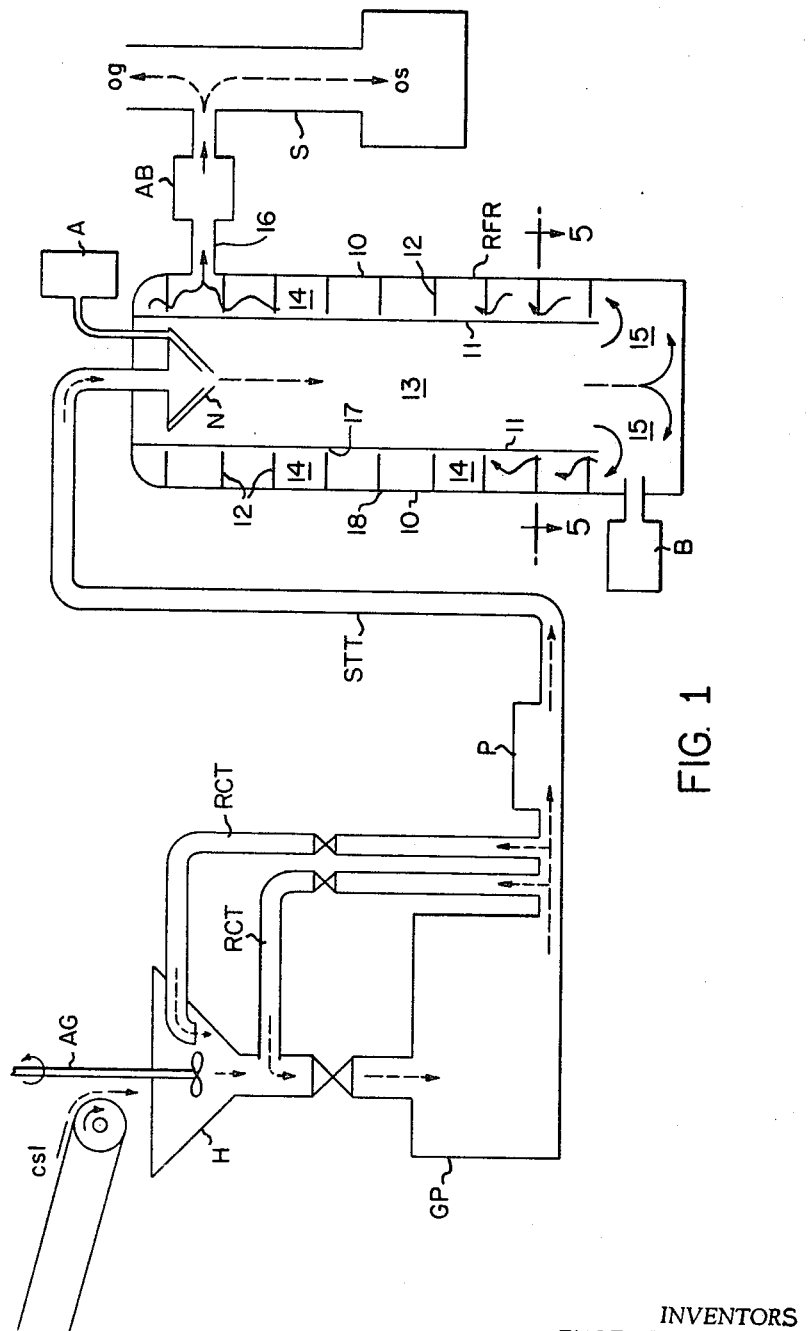
FIG. 1 is a schematic diagram of a sewage sludge transport and treatment apparatus employing a reverse flow reactor of this invention wherein annulus flow guide elements provide an alternatingly constricted and expanded flowpath which also leads toward and away from the outer shell.

In FIG. 1, the material to be thermally treated, say sewage sludge "csl," is dropped into hopper H, made flowable by shearing with agitator AG and by grinding and pumping by grinder-pump GP; the material is then pumped by advancing cavity pump P through delivery tube STT to atomizing nozzle N opening within inner shell 11 of reverse flow reactor RFR. The sludge is finely divided in atomizing nozzle N with the help of a gas oxygen or air, flowing from source A into the nozzle. The gas acts both as a carrier for the divided material and subsequently as a reactant. The finely divided sludge particles pass downward through heat treatment and volatilization zone 13 in the form of a mist. Therein they are heated by the radiant action of heated wall 11. The liquid components of the sludge particles are largely volatilized in zone 13 to form gases and dry solid particles which become hotter in downward passage. At oxidation, i.e. ignition, temperatures the oxidizable substances quickly react with the oxygen in the carrier gas. In this embodiment, the vapors, gases and solids pass from zone 13 into zone 15 where oxidizable components are substantially reacted with the oxygen flowing therewith. Heating element B provides enough thermal energy to permit substantial oxidation of the oxidizable components of the sludge. The hot flowing materials then pass in reverse flow direction into annulus 14 between shells 11 and 10. They follow a tortuous path therein by flowing upward around flow guide elements 12 attached to wall 10 at 18. The flowpath is alternatingly constricted and expanded between the shells and elements 12 which provides great acceleration and substantial turbulence in the flow of the hot materials. Also, the acceleration of the hot flowing materials is promoted by the tortuous pathway to permit adequate and repeated contacts of the hot flowing materials with wall 11 to permit more adequate transfer of heat. Further, prolonging the residence or detention time of the hot flowing materials in at least the hot lower portions of the annulus permits more complete oxidation of those portions of sludge which may have been incompletely oxidized in spaces 13 and 15. The flowing materials, now substantially oxidized and somewhat cooled by heat transfer in their passage along the tortuous pathway, pass out of the reactor through pipe 16 to be discharged as odorless and non-noxious gases "og" and solids "os." The solids may conveniently be collected in stack S for disposal.

In FIG. 2, material inlet means N is disposed within inner shell 11, which shell defines volatilization and heat treatment zone 13. Shell 11 is spaced from outer shell 10 so as to define heat transfer zone 14 therebetween. The lower end of shell 11 is open and spaced above the lower end of outer shell 10 so as to define heat treatment and reaction zone 15 therebetween. Helical flow guide means 12 is disposed intermediate shells 10 and 11 so as to define a tortuous, e.g. helical, flowpath in heat transfer cavity 14. An external source of thermal energy B, in this embodiment, has bottom entry for supplying heat to the reactor. The bottom entry is shielded from deposits of solids by shield 17. Exemplary gas inlet means from one or more sources A, R, $R^1$, $R^2$, $R^3$ and $R^4$ is shown, which means admits carrier and/or reactive fluids to the reactor. Fluid from A enters at atomizing and material inlet means N; fluid from $R^3$ enters at a point within zone 13 adjacent the material inlet means; fluid from R enters at a point within zone 13 spaced from inlet means N; fluid from $R^1$ enters at a point within zone 13 further spaced from inlet means N; fluid from $R^2$ enters at a point below shell 11 and zone 13 within heat treatment and reaction zone 15; and fluid from $R^4$ enters at a point within heat treatment and transfer zone 14. In general, while gases are the preferred fluids as carriers and reactants, the fluids so admitted may be either gases per se or liquids capable of being converted to gases at prevailing temperatures within the reactor.

FIG. 3 shows alternate attachment of flow guide elements 12 to shells 10 and 11 at 18. The tortuous flowpath defined by the shells and flow guide elements is constricted in spaces 17 and expanded therebetween; the flowpath leads toward and then away from shells 10 and 11. The elements thrust downwardly away from their points of attachment on the inner and outer shell walls.

In FIG. 4, flow guide elements 12 are attached, at 18, at right angles to inner shell 11. Hot treated materials flowing through zones 13 and 15 pass into zone 14 to follow a tortuous pathway therethrough that is alternatingly constricted at spaces 17 and expanded therebetween; in so doing, the pathway sequentially leads away from and toward inner shell 11. An external source of thermal energy B has entry to zone 15 through the side of the reactor.

Heat for thermal treatment of finely particulate material may be supplied to the reactor by heating elements of diverse nature, such as by gas or oil fired burners, or by electrical heaters. Another suitable method for heating the reactor is by admitting high temperature carrier or reactive gases; and yet another method is by admitting hot finely particulate matter to the reactor, say at a sufficiently high temperature to initiate the exothermic evolution of heat, for example, by chemical reaction of the material with some gas as in oxidation. The particular means for heating the reactor and its source and/or positioning entry within or without the reactor may readily be selected by those knowledgeable in the art to suit the needs of specific situations. For the thermal oxidation of sewage sludge, we prefer to use a gas or oil fired burner opening into the reactor at a point below the inner shell; however, many concentrated sludges or other particulate materials are capable of self-sustained oxidation or other exothermic reactions, and so a burning charge of sludge or coal or other combustible material may be admitted to the reactor prior to its use and act as kindling for the continuous and self-sustained oxidation or other exothermic reaction of flowing particulate materials during treatment; the only requirement in the latter instance is that the temperature of the kindling be at or above the ignition or reaction temperature point of the material. Thermally activated endothermic reactions or changes also may be conducted in the present reactor, but in this instance, some heating element would prove desirable. In a sequential combination of exothermal and endothermal changes, consideration of the thermodynamic demands of the combination will enable the practitioner to determine whether and where an external heat source is needed for adequate thermal treatment of the particulate material.

In the preferred embodiments shown in FIGS. 1 to 4, external sources of thermal energy are shown; however, as previously noted, such sources are not required to practice the invention in its broadest aspects. For example, where materials and/or gases are supplied to the reactor at temperatures high enough to initiate and/or provide the desired thermal changes and/or reactions, and/or where the reactions are exothermic to the degree where they are thermally self-sustaining such external sources of thermal energy are not needed to practice the invention. Other instances of use of the present reactor and process without external sources of thermal energy will readily occur to those skilled in the art.

Figure 5:
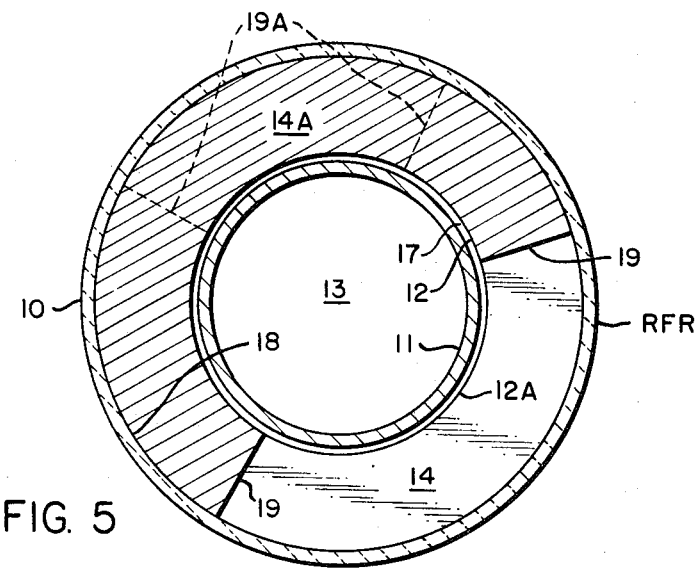
FIG. 5 is a horizontal cross-sectional view taken along line 5—5 of FIG. 1.

FIG. 5 shows in horizontal cross-section the disposition of flow guide elements within the heat transfer zone of FIG. 1 along line 5—5; element 12 is in the plane of the paper and adjacent element 12A is beneath it. Elements 12 and 12A are attached at right angles to outer shell 10 of reactor RFR at 18. Element 12 extends horizontally between edges 19, and element 12A extends between edges 19A. The flow guide elements provide a winding and constricted flowpath at spaces 17 and in the volumes defined between the overlap of adjacent elements 12 and 12A. The overlap is shown to extend from edge 19 to edge 19A. The flowpath is expanded in the spaces 14 and 14A especially where there is no overlap of adjacent elements.

Figure 6:
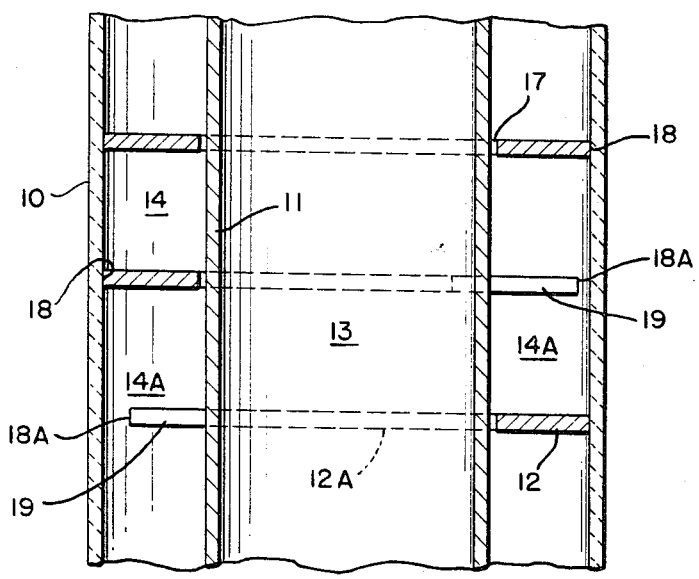
FIG. 6 is a more detailed view in partial vertical cross-section of the reactor embodiment shown in FIG. 1.

In FIG. 6, a partial vertical cross-sectional view of the central portion of the reactor in FIG. 1, horizontal flow guide elements 12 are attached at right angles to outer shell 10 at 18 and terminate in edges 19 which extend horizontally from their attachment at 18A to space 17 proximal inner shell 11. The flowpath of materials through heat transfer zone 14 is constricted by flow guide elements 12 at spaces 17 between the elements and inner shell 11; and it is expanded in volumes between the adjacent elements where they overlap; the adjacent flow guide elements are shown in cross-section. The flowpath is further expanded in spaces where adjacent flow guide elements do not overlap, designated 14A. The portions of elements 12 behind the plane of the paper in FIG. 6 are designated 12A.

*The process summary*

The objects of the invention are further realized by a process for the continuous reaction of material, preferably a solid, semi-solid, liquid and/or their combination, with a gaseous reactant, comprising the steps of (a) reducing the material to a finely divided state, i.e., from 0.1 to 100 microns, preferably by atomization to form a mist; (b) heating the material in a volatilization zone bounded by one surface of a heated wall so as to volatilize the liquid components, such as in zone 13 heated by the inner surface of shell 11; (c) reacting the products of the volatilization zone with a gas capable of reacting with them at a suitable reaction temperature therefor, such as by reacting the volatilized oxidizable gases and the oxidizable solids with oxygen flowing therewith in those portions of heat treatment and volatilization zone 13, and in heat treatment and reaction zone 15 and heat treatment and transfer zone 14 which are at an oxidation inducing temperature, e.g., ignition temperature; and (d) passing the hot reaction products along another surface of the heated wall in a tortuous pathway so as to transfer heat from the products to the wall, such as by passing the hot reaction products through zone 14 along the tortuous pathway defined by flow guide means 12 to transfer heat to the outer surface of inner shell 11 for reuse in zone 13.

*Use with sewage sludge, embodiment*

The present reverse flow reactor and process are especially useful in destroying sewage sludges, e.g. aqueous sludge suspensions with a solids content of 0.1 to 50% by weight, and in particular concentrated sewage sludges in the range of about 7 to 35% solids by weight, to provide easily disposable odor-free and non-noxious gaseous and solid products.

In typical use, a sewage sludge is delivered to and atomized by a particulating device such as the atomizing nozzle shown in the drawings or disclosed in U.S. Patents 2,519,619 and 3,070,313. The finely divided sludge particles formed desirably range in size from about 0.1 to 100 microns and appear as a "mist." In one trial, the particle size distribution obtained for an atomized partially digested and thickened primary sewage sludge of 19% solids content was

| Particle size (microns): | Percent of particles ($\pm 0.2\%$) |
| --- | --- |
| <15 | 41.2 |
| 15–25 | 42.2 |
| 26–35 | 9.8 |
| 36–75 | 5.0 |
| >75 | 2.0 |
|  | 100.2 |

The particles, which are primarily mixtures of water, organic liquids and organic and inorganic sludge solids, are then heat treated by passage in turbulent fashion through a volatilization zone within the inner shell of the reactor. The turbulently flowing particles and carrier gas are radiantly heated by the inner shell and are also heated by contact with one another. Desirably, the inner shell is of a refractory, heat conductive and radiating material such as a structural metal, and most preferably an oxidation and otherwise chemical resisting structural metal like stainless steel. The liquid and other volatilizable portions of the finely divided sludge particles are gasified. The temperature of the gases and solids produced increases in their downward passage by continued conductive, convective and radiant heating; convective and conductive heating by contact of hot with cooler material during turbulent flow through the inner shell and radiant heating by the heated wall of the inner shell. When the materials reach ignition temperatures, rapid oxidation occurs. This takes place in zone 13, in its hot lower reaches, and in thermal reaction zone 15 below the inner shell, and also in heat transfer zone 14, in its hot tortuous lower reaches. Preferably a supplementary source of thermal energy is used for sludge treatment, initially to bring the lower portions of the reactor to ignition, i.e. rapid oxidation, temperatures and also to replenish that heat unavoidably lost by subsequent flow of hot oxidized gaseous and solid products from the reactor. The external heat source preferably may be in the form of electrical heating elements, or oil or gas burners having entry to the reactor below the inner shell. Also, a supplementary flow of oxygen entering the reactor within the inner shell or within the space below the inner shell aids in providing enough reactant gas to effect the complete and rapid oxidation of the sludge at reaction temperatures, say 600 to 2000° F.

The design parameters, e.g. lengths, widths, spacing of flow guide elements, heat and temperature requirements of the reactor and the amount of oxygen required may be determined by conventional engineering methods for some desired throughput of specific materials, considering the number of B.t.u.'s required per unit time for volatilizing a sludge of specific water content, for the complete oxidation of its oxidizable components, and considering the number of B.t.u.'s per unit time generated within the reactor by the exothermic oxidation of the sludge. A thermally self-sufficient process, i.e. pounds of dried sewage solids, within the reactor, per unit time, is that required to generate enough B.t.u.'s upon oxidation to satisfy completely the heat requirements of the reactor. This, for example, was shown by Helfgott and Webber in the aforesaid article, page 78, FIG. 4, to be a function of the amount of excess air used over that required for oxidation per pound of solids for given percentages of solids content of the sludge. The required detention times at specific temperatures for complete destruction of sludges of different solids content can be determined experimentally, e.g. using the technique of Sawyer and Kahn, "Temperature Requirement for Odor Destruction in Sludge Incineration," Journal of Water Pollution Control Federation, pp. 1274–1278, December 1960.

*Example*

The following example illustrates use of a particular embodiment of the reverse flow reactor and process of the invention for the destruction of sewage sludge, and is presented merely to show practice of the invention, the scope of which is neither defined thereby nor limited thereto.

A reverse flow reactor of the invention useful for the oxidative destruction and complete odor abatement of a concentrated sanitary sewage waste sludge of about 13% solids, with a through-put feed of approximately 4 gallons per minute of sludge, is constructed to permit heat transfer and reuse of approximately 6,000 to 10,000 B.t.u.'s per square foot of inner shell surface per minute. It is generally in the form of a right circular cylinder of the design shown in FIG. 1 with placement of flow guide elements as is shown in FIG. 4, i.e. attachment to the inner shell. An oil fired burner has entry to the reactor as shown in FIG. 4 with entry of an auxiliary flow of air proximal the entry of the oil fired burner. The auxiliary flow of air during operation, in addition to supplying quantities of reactant oxygen such that in all approximately 50% excess of oxygen above the theoretical oxidation requirement is provided, also helps to cool the refractory wall of the outer shell near the burner entry to help prevent spallation.

The inner shell and flow guide elements are of stainless steel, as is the atomizing nozzle. The outer shell is of fire brick.

The internal dimensions of the reactor are

| Item | Dimension | Approximate Size Or Placement |
|---|---|---|
| Outer Shell | Internal Height | 22 ft. |
| | Internal Diameter: | |
| | From Bottom to 4 ft. 5 inches from Bottom. | 5 ft. 1¾ inches. |
| | From Top to 6 ft. 4 inches from Bottom. | N 5 ft. 4¾ inches. |
| Inner Shell | Height | 17 ft. 7 inches. |
| | Thickness | 0.125 inch. |
| | Diameter | 5 ft. |
| | Surface Area | 276.4 sq. ft. |
| Annulus Between Shells | Height | 17 ft. 7 inches. |
| | Radial Width from 6 ft. 4 inches from Bottom to Top of Reactor. | 4¾ inches. |
| Flow Guide Plates | Thickness | ⅜ inch. |
| | Topmost Plate from Reactor Top. | 1 ft. 3 inches. |
| | Bottommost Plate from Reactor Bottom. | 7 ft. |
| | Spacing: | |
| | Between Adjacent Plates. | 9 inches. |
| | From Outer Shell to Plate Edge. | ¾ inch. |
| | Opening in Plate, Wedge Shaped, Radial Cut 45°. | 1 ft. at edge (circumference). |
| | Openings in Adjacent Plates. | Staggered 180°. |
| Tortuous Flowpath | Average Length | 228 ft. 7 inches. |
| Outlet in Outer Shell | Center Spacing from Reactor Top. | 1 ft. 3 inches. |
| | Diameter | 1 ft. 2 inches. |
| Burner | Entry Distance from Reactor Bottom. | 3 ft. 4 inches. |
| Auxiliary Air Supply | Entry Distance from Reactor Bottom. | 3 ft. 4 inches. |
| Atomizing Nozzle | Entry to Reactor Top | Centered. |

The reactor is fed a 13% solids content partially dewatered sanitary sewage sludge at 70° F. through the atomizing nozzle at the rate of about 4 gal./min. Air is supplied through the nozzle at the rate of about 100 "standard" cubic feet per minute (s.c.f./m.), i.e. "standard" means corrected to 1 atmosphere pressure and 60° F., to aid atomization of the sludge to a mist, to carry mist downward through the core space defined by the heated inner shell for volatilization and oxidation, and to supply a portion of the oxygen needed for sludge destruction. The temperature of the mist substances in the core space increases from 70° F. at entry to 212° F. whereat volatilization of water is completed, and then to about 600° F., whereat rapid oxidation occurs. The temperature of the mist substances continues to rise to about 1500 to 2000° F. which are the temperatures prevailing in the reactor space below the inner shell. These temperatures are mainly the result of the exothermic release of heat due to oxidation of the sludge. The flow rate within the core and bottom spaces is about 7 ft./sec. Air is mixed with the burning fuel so as to supply about 400 s.c.f./m. Air is also supplied from the auxiliary source at the rate of about 500 s.c.f./m., thus, in all, to supply oxygen in an amount in 50% excess of that theoretically required to oxidize the sludge. As the thermally treated materials enter the annulus, their velocity is accelerated to about 90 ft./sec. The narrowing of the annular cavity at entrance is believed to help provide a more even influx of materials around the reactor. Within the space between the entrance to the annular cavity and the bottommost flow guide plate, the velocity of the materials is substantially reduced below 60 ft./sec. as the material expands to fill the space; and upon flow through the horizontal 1 foot opening in the first plate, the flow of materials is increased to about 60 ft./sec. Also, the velocity of materials passing through the space between the outer wall and the edge of the plate is increased to about 90 ft./sec. In similar fashion, as the material passes into spaces between adjacent plates its flow is slowed as it expands to fill the spaces, and is accelerated upon constriction as it goes through the opening in the plates. Substantial amounts of heat are transferred from the materials to the inner shell during their tortuous passage. The materials coming through the outlet have temperatures near 1050° F., and have a flow of about 600 s.c.f./m. The detention time of materials flowing within the annular heat transfer space, i.e. time of passage, is approximately 1.5 seconds. The gaseous and solid ash products exiting the reactor are odorless and otherwise non-noxious and easily disposable materials.

Employing an identical reactor which, however, has no flow guide elements, with an identical sludge, feed rate, temperature range within the core and bottom spaces, gas quantities and flow provide an identical detention time within the annular space but with a flow velocity therein of about 7 ft./sec., and gaseous and solid products which are both malodorous and noxious at exit temperatures of about 1350 to 1400° F. The latter temperatures indicate minimal heat transfer to the inner shell. Comparable total heat transfer with a comparable reactor without flow guide elements to that obtained with the reactor plus flow guide elements may be obtained by lengthening the inner shell thus lengthening the flow path to approximately 13 times the length of the exemplary inner shell, and thus also enlarging the reactor to about 230 to 235 feet high. This, however, is not only outside the realm of economic possibility, but if done would increase the surface area of the inner shell enormously and thus prohibit heat transfer through the inner shell at the desired rate of 6000 to 10,000 B.t.u./sq. ft. per sec. Narrowing the annulus, while increasing the velocity of materials therethrough and thus somewhat improving heat transfer to the inner shell, would also substantially decrease the detention time of the materials below that needed to destroy the malodorous and noxious substances.

In general, hot materials flowing up the space between the inner and outer shells serve two functions. First, these hot gases transfer heat to the inner shell which heat is, in turn, transferred through the inner shell to the gases in the core of the reactor. The principles of thermodynamics indicate that for maximum heat transfer this gas flow should be turbulent and of high velocity. This could obviously be accomplished by making the annulus very small, but this would provide low retention times. The gases reach their maximum temperature at the bottom of the annulus and must be held above certain temperatures for certain minimum lengths of time if all odors are to be destroyed (i.e., all odor producing components of the gas are to be completely stabilized). This requires that the gas be held in the annulus for a certain length of time for discharge to atmosphere and would tend to make the annulus large. Flow guide elements introduced into the annulus are a means of satisfying these two requirements according to the invention.

The design of the flow guide elements is based on the retention time desired. Gas retention times may vary from a fraction of a second at temperatures in the order of 1200 to 1500° F. to as much as 2 or 3 seconds at temperatures in the order of 1000 to 1100° F. for odor abatement. The exact detention time required depends on the nature of the odor producing elements as well as the temperature.

We claim:
1. A reverse flow thermal reactor for conducting gaseous reactions of a particulate material, said reactor comprising, in combination:
 (a) a vessel including a substantially cylindrical vertical outer shell having a thermal reaction zone in the lower portion thereof;
 (b) a substantially cylindrical vertical inner shell disposed within said outer shell and spaced from said outer shell so as to define an annular space therebetween, the inner surface of said inner shell defining a first reaction zone and the lower end of said inner shell being open and spaced above the lower end of said outer shell, said first reaction zone communicating through said open end with said thermal reaction zone;
 (c) atomizing means adjacent the upper end of said inner shell for introducing an atomized stream of said particulate material downwardly into and through said first reaction zone and thereafter into said thermal reaction zone;
 (d) baffle members arranged within and defining a tortuous flow path in said annular space between said inner and outer shells for directing the flow of products from said thermal reaction zone upwardly through said annular space and across the outer surface of said inner shell;
 (e) gas inlet means disposed within said vessel; and
 (f) outlet means in said outer shell communicating with the upper end of said annular space.

2. A reverse flow thermal reactor according to claim 1 wherein said baffle members define a helical flow path in said annular space and about said inner shell.

3. A reverse flow thermal reactor according to claim 1 wherein said baffle members define a flow path alternately constricted and expanded to direct the upward flow of products from said reaction zone in said annular space alternately toward and away from the outer surface of said inner shell.

References Cited

UNITED STATES PATENTS

| | | |
|---|---|---|
| 1,137,232 | 4/1915 | Ricketts. |
| 1,576,787 | 3/1926 | Reichhelm. |
| 1,697,524 | 1/1929 | Epstein. |
| 1,755,949 | 4/1930 | Clarkson _____ 122—173 |
| 1,784,338 | 12/1930 | Clarkson _____ 122—173 |
| 3,322,079 | 5/1967 | Komline et al. _____ 110—8 |

JAMES W. WESTHAVER, *Primary Examiner.*

UNITED STATES PATENT OFFICE
CERTIFICATE OF CORRECTION

Patent No. 3,395,654                                                    August 6, 1968

Eugene Weisberg et al.

It is certified that error appears in the above identified patent and that said Letters Patent are hereby corrected as shown below:

Column 2, line 29, "tough" should read -- enough --. Column 4, lines 41 and 42, the lines written upside down should read -- fine a tortuous, e.g. helical, flowpath in heat transfer cavity 14. An external source of thermal energy B, in this --. Column 8, in the table, second column, line 5 thereof, cancel "N".

Signed and sealed this 24th day of February 1970.

(SEAL)

Attest:

Edward M. Fletcher, Jr.                              WILLIAM E. SCHUYLER, JR.

Attesting Officer                                                  Commissioner of Patents